United States Patent
Folgoas et al.

(10) Patent No.: US 12,223,126 B2
(45) Date of Patent: Feb. 11, 2025

(54) WRITING INSTRUMENT AND METHOD

(71) Applicants: SOCIÉTÉ BIC, Clichy (FR); BIC Violex Single Member S.A., Anoixi (GR)

(72) Inventors: Loic Folgoas, Clichy (FR); Georgios Georgakis, Aoixi (GR)

(73) Assignees: SOCIÉTÉ BIC, Clichy (FR); BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 18/004,566

(22) PCT Filed: Jul. 1, 2021

(86) PCT No.: PCT/EP2021/068194
§ 371 (c)(1),
(2) Date: Jan. 6, 2023

(87) PCT Pub. No.: WO2022/008343
PCT Pub. Date: Jan. 13, 2022

(65) Prior Publication Data
US 2024/0241591 A1     Jul. 18, 2024

(30) Foreign Application Priority Data
Jul. 7, 2020   (EP) .................... 20305779

(51) Int. Cl.
*G06F 3/0354*   (2013.01)
*G01S 13/72*   (2006.01)
*G06F 3/039*   (2013.01)

(52) U.S. Cl.
CPC .......... *G06F 3/03545* (2013.01); *G01S 13/72* (2013.01); *G06F 3/039* (2013.01)

(58) Field of Classification Search
None
See application file for complete search history.

(56) References Cited

U.S. PATENT DOCUMENTS

| | | | |
|---|---|---|---|
| 5,781,661 A | 7/1998 | Hiraiwa et al. | |
| 7,941,338 B2 | 5/2011 | Silverbrook et al. | |
| 8,297,868 B2 | 10/2012 | Underwood et al. | |
| 8,542,219 B2 * | 9/2013 | Carl .................... | G06F 3/03545 345/166 |
| 8,742,933 B2 | 6/2014 | Asad et al. | |

(Continued)

FOREIGN PATENT DOCUMENTS

| | | |
|---|---|---|
| EP | 2717122 A1 | 4/2014 |
| WO | 0011596 A1 | 3/2000 |

OTHER PUBLICATIONS

International Search Report and Written Opinion issued in International Application No. PCT/EP2021/068194 on Sep. 29, 2021 (14 pages).

*Primary Examiner* — Matthew Yeung
(74) *Attorney, Agent, or Firm* — Bookoff McAndrews, PLLC (57) ABSTRACT

A writing instrument comprising a body, the body being provided with a writing tip and a position detection device, the position detection device being configured to provide data for determining a position of the body in a space, the position detection device comprising a tip pressure sensor, an inertial measurement unit, and a network of radio antennas.

20 Claims, 6 Drawing Sheets

(56) References Cited

U.S. PATENT DOCUMENTS

| | | |
|---|---|---|
| 2015/0029164 A1 | 1/2015 | Liu |
| 2016/0139690 A1 | 5/2016 | Chang |
| 2016/0179222 A1 | 6/2016 | Chang |
| 2018/0018057 A1* | 1/2018 | Bushnell ............... G06F 3/0412 |
| 2018/0143703 A1* | 5/2018 | Fleck ..................... G06F 3/0383 |
| 2020/0336183 A1* | 10/2020 | Tsai ...................... H04B 7/0617 |

\* cited by examiner

WRITING INSTRUMENT AND METHOD

CROSS REFERENCE TO RELATED APPLICATIONS

This application is a National Stage application of International Application No. PCT/EP2021/068194, filed on Jul. 1, 2021, now published as WO 2022/008343 A1, which claims benefit from European patent application EP20305779.9 filed on Jul. 7, 2020, its content being incorporated herein by reference.

TECHNICAL FIELD

The present disclosure relates to a writing instrument, for example a writing instrument configured to be tracked and positioned in a 2D or 3D space, for example in the frame of augmented reality applications and/or writing digitalization. The present disclosure also relates to a method for tracking and positioning a writing instrument in a 2D or 3D space.

BACKGROUND

Traditional writing instruments configured to be tracked and positioned in a 2D or 3D space (i.e. a two or three dimensions space) and methods thereof may be not accurate enough. This applies even for active writing instruments. Therefore, a need exists to provide a writing instruments configured to be tracked and positioned in a 2D or 3D space and methods thereof having an improved accuracy.

SUMMARY

In one aspect a writing instrument comprises a body, the body being provided with a writing tip and a position detection device, the position detection device being configured to provide data for determining a position of the body in a 2D or 3D space. The position detection device comprises a tip pressure sensor, an inertial measurement unit, and a network of radio antennas configured such that the position of the body in the 2D space is tracked by sensor fusion. The network of radio antennas provides radio antenna data of the writing instrument, the radio antenna data being used for radio location of the body.

The writing tip may be a felt tip, a ballpoint tip, a mechanical pencil, a graphite pencil lead, chalk, a stylus tip or any other type of tip making it possible to write on a substrate or surface. The writing tip may be fixed, i.e. always extending out of the body. The writing tip itself may be passive, i.e. without any electric powered element/electronic element.

In the following, unless otherwise specified, "space" should be understood as "2D or 3D space".

The combination of the data provided by the three different sensors, i.e. the tip pressure sensor data, the inertial measurement unit data and the network of radio antennas data, may allow an accurate determination of the position and movement of the body, for example during writing. For example, such a determination may be carried out using sensor fusion. It is reminded that sensor fusion is a process of combining data from different sources/sensors such that the resulting information has less uncertainty (i.e. it is more accurate) than would be possible when these sources/sensors were used individually. Sensor fusion as such is well known by the skilled person, and not described in detail.

In embodiments, the inertial measurement unit may comprise one or more among a gyroscope, an accelerometer and a magnetometer.

In examples, the network of radio antennas may comprise one or more networks of radio antennas.

In embodiments, the position detection device may be configured to wirelessly transmit data to a receiver (which may be an emitter/receiver).

In embodiments, the position detection device may be configured to wirelessly receive data from an emitter which may be an emitter/receiver.

In embodiments, the position detection device may comprise a controller. The controller may comprise a central processing unit (or CPU) and/or a storage unit and/or a data transfer module. The controller may have a computer architecture.

In embodiments, the position detection device may be powered by a power source.

The power source may be a battery or a cell. The power source may power any element of the position detection device, for example a sensor or a controller.

In embodiments, the writing instrument may comprise a removable cap configured to protect the writing tip, the removable cap may be provided with an auxiliary position detection device, the auxiliary position device may comprise an auxiliary inertial measurement unit and at least one auxiliary radio antenna.

The removable cap may be placed or removed from the body in order to protect or use the writing tip, respectively. The removable cap may be mounted onto the rear end of the writing instrument, for example during writing.

In examples, the removable cap may be used for positioning the body in a space by being placed on a writing surface, using the removable cap as reference position point and an electronic smart device as processing unit. In examples, the removable cap may be used for positioning the body in a space by being placed onto the rear end of the writing instrument, using the removable cap as additional means with regard to the position detection device, for example in order to increase measurements accuracy, and using an electronic smart device as reference point and as processing unit.

In the following, unless otherwise specified, "the auxiliary antenna" should be understood as "the at least one auxiliary antenna".

In embodiments, the auxiliary inertial measurement unit may comprise one or more among a gyroscope, an accelerometer and a magnetometer In embodiments, the auxiliary position detection device may comprise an auxiliary network of radio antennas.

In examples, the at least one auxiliary radio antenna may comprise a plurality of auxiliary radio antennas, the plurality of auxiliary radio antennas may form a networks of auxiliary radio antennas. In examples, the at least one auxiliary radio antenna may comprise one or more individual auxiliary radio antennas and/or one or more networks of auxiliary radio antennas.

In embodiments, the auxiliary position detection device may be configured to wireless transmit data to a receiver (which may be an emitter/receiver) and/or to the position detection device.

In embodiments, the auxiliary position detection device may be configured to wireless receive data from an emitter (which may be an emitter/receiver) and/or from the position detection device From the position detection device, the auxiliary position detection device may be considered as an emitter and/or receiver. In the same way, from the auxiliary position detection device, the position detection device may be considered as an emitter and/or receiver. The position detection device and/or the auxiliary position detection device may each interact with one or more emitter and/or receiver, different from the auxiliary position detection device/position detection device, respectively.

In embodiments, the auxiliary position detection device may comprise an auxiliary controller. The auxiliary controller may comprise an auxiliary central processing unit (or CPU) and/or an auxiliary storage unit and/or an auxiliary data transfer module. The auxiliary controller may have a computer architecture.

In embodiments, the position detection device may be powered by an auxiliary power source.

The auxiliary power source may be a battery or a cell. The auxiliary power source may power any element of the auxiliary position detection device, for example a sensor or a controller.

In embodiments, the writing instrument may be active, i.e. it may comprise one or more electric powered element/electronic element. In examples, the body and/or the cap may comprise an active device, for example the position detection device and/or the auxiliary position detection device may be active. The writing tip may be passive.

In embodiments, a method for tracking and positioning a writing instrument in a space, i.e. 2D or 3D space, comprises providing a writing instrument substantially as described herein, and processing data provided by the position detection device by sensor fusion.

The method may be carried out in real time when using the writing instrument, or not.

In embodiments, the method may comprise a radio location based on a distance measure such as a signal strength measure or a time to flight measure, the radio location being carried out from the network of radio antennas data, and a motion measure carried out from the tip pressure sensor data and the inertial measurement unit data, and processing the radio location data and the motion measure data by sensor fusion. Radio location refers to the transmission of the radio signal and calculation of the transmitter location to provide location data, i.e. acting as a radar localization.

Radio location and motion measurement techniques and devices are each known as such by the skilled person and are not described in detail.

In embodiments, the sensor fusion processing may be carried out using an extended Kalman filter.

Extended Kalman filters are known as such by the skilled person and are not described in detail.

In embodiments, an electronic smart device may be used as reference position point and as processing unit.

An electronic smart device may be a multimedia tablet, a smartphone, a smartwatch, a laptop, a computer, etc.

A reference point may be a point the position of which is known, and relatively to which the body position is determined. In other words, the position of the body may be determined relatively to a reference point.

In embodiments, the method may comprise providing a writing instrument comprising a removable cap having an auxiliary position detection device substantially as described herein, removing the removable cap from the body and placing the removable cap on a writing surface, using the removable cap as reference position point and an electronic smart device as processing unit.

In embodiments, a computer program includes instructions for executing the steps of the method substantially as described herein when the program is executed by a computer.

The program may use any programming language and may take the form of source code, object code or a code intermediate between source code and object code, such as a partially compiled form, or any other desirable form.

In embodiments, a recording medium readable by a computer has recorded thereon a computer program including instructions for executing the steps of the method substantially as described herein.

The recording medium may be any entity or device capable of storing the program. For example, the medium may include storage means such as a ROM, for example a CD ROM or a microelectronic circuit ROM, or magnetic storage means, for example a diskette (floppy disk) or a hard disk. In examples, the recording medium may be an integrated circuit in which the program is incorporated, the circuit being adapted to execute the method in question or to be used in its execution.

Such writing instruments and methods may form improved writing instrument adapted for augmented reality applications and/or writing digitalization. Such writing instruments and methods may help to accurately determine and track the position of the writing instrument in a 2D or 3D space.

BRIEF DESCRIPTION OF THE DRAWINGS

The disclosure can be better understood by reading the detailed description of various embodiments given as non-limiting examples.

The description refers to the accompanying sheets of figures, in which.

DETAILED DESCRIPTION

Figure 1:
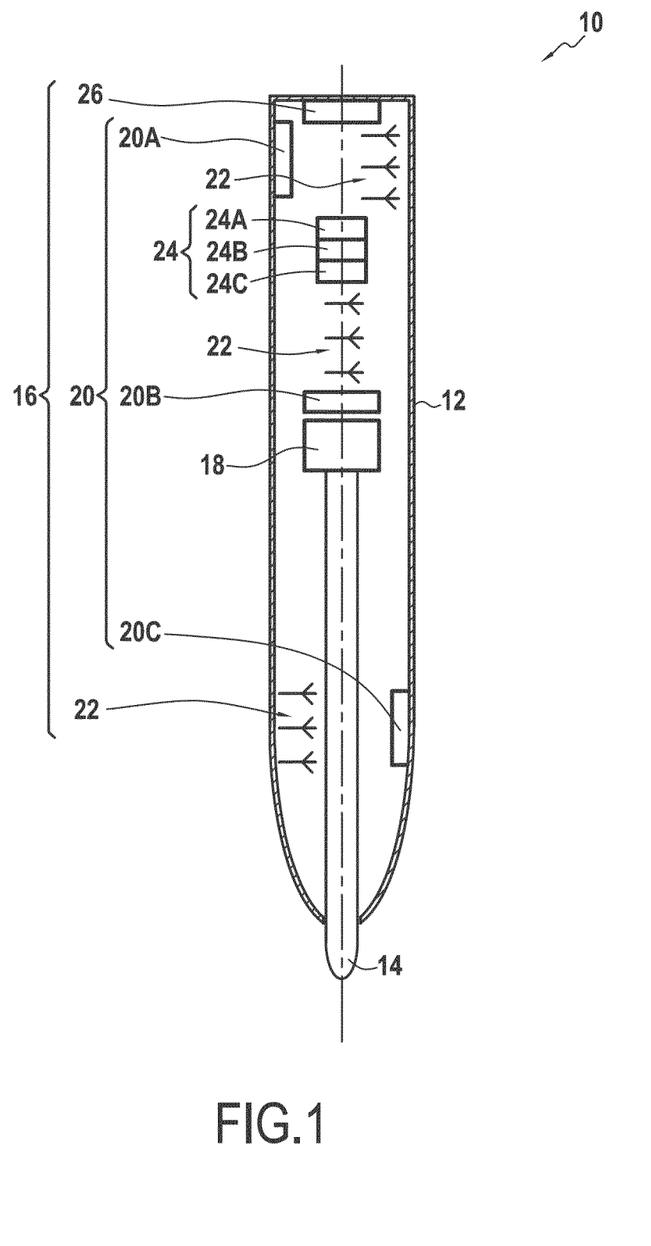
FIG. 1 shows a first embodiment of a writing instrument.

FIG. 1 shows a first embodiment of a writing instrument 10, in this example a ball point pen is shown. The writing instrument 10 comprises a body 12 provided with a writing tip 14, in this example a fixed ball point, and a position detection device 16 configured to provide data for determining a position of the body 12 in a space. The position detection device 16 comprises a tip pressure sensor 18, an inertial measurement unit 20, and a network of radio antennas 22. The inertial measurement unit 20 may comprise an accelerometer 20A, a gyroscope 20B and/or a magnetometer 20C. The position detection device 16 may comprise a controller 24. The controller 24 may comprise a central processing unit 24A, a storage unit 24B and a transfer module 24C which may be configured to wirelessly transmit and/or receive data to/from one or more emitter/receiver. The position detection device 16 may comprise a power source 26.

Figure 2:
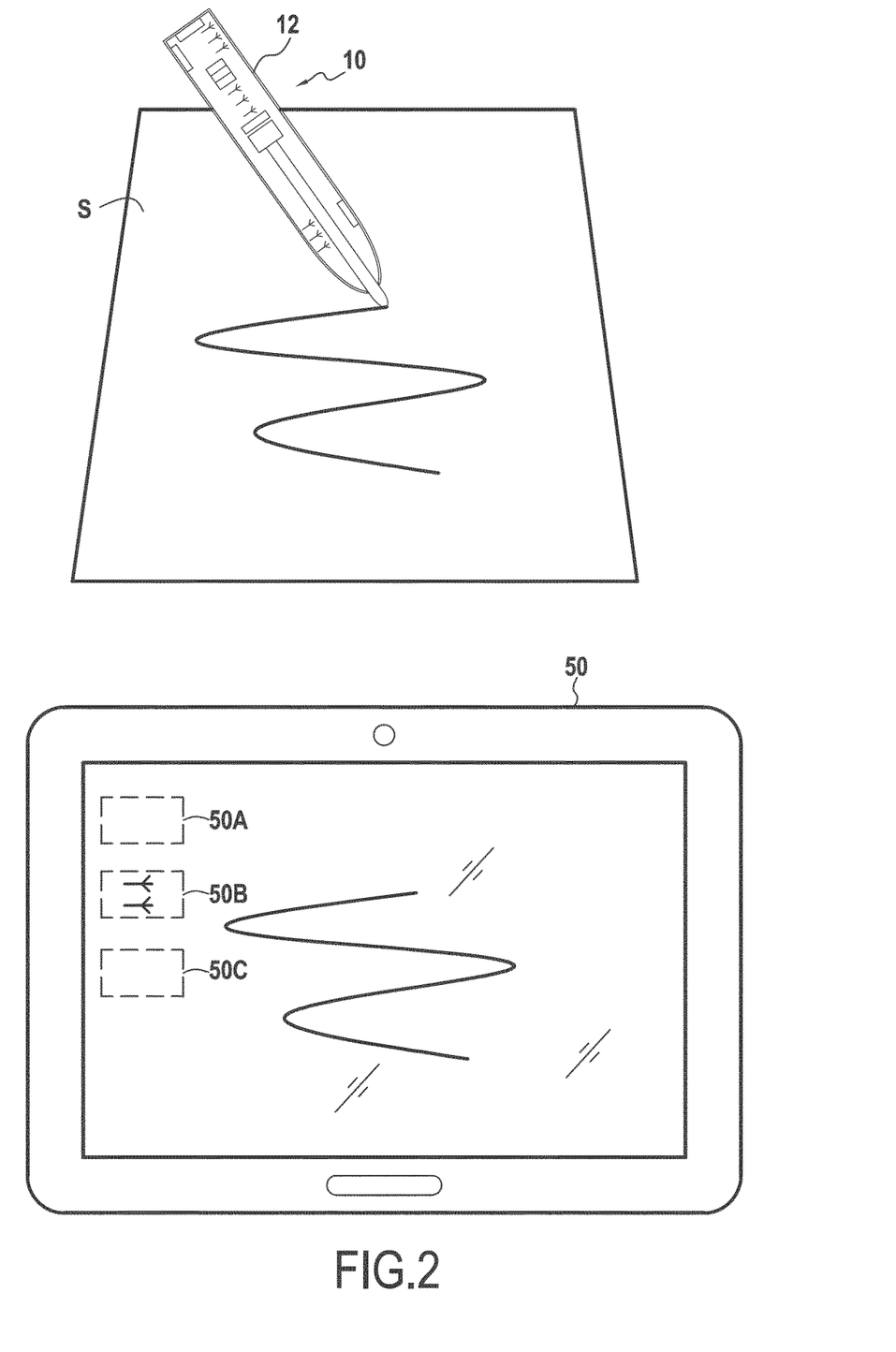
FIG. 2 shows a use of the writing instrument of FIG. 1.

FIG. 2 shows the writing instrument 10, used for writing onto a writing surface S. An electronic smart device 50, in this example a multimedia tablet, may comprise a recording medium 50A readable by a computer and may have recorded thereon a computer program including instructions for executing the steps of the method described hereafter. In other words, the electronic smart device 50 may include an application, as a computer program including instructions for executing the steps of the method described hereafter when the program is executed by a computer (in this example the electronic smart device 50).

An application of the electronic smart device 50 may be configured to digitalize the writing of the writing instrument 10. The digitalization may be carried out real time during writing. The digitalization application may comprise a method for tracking and positioning a writing instrument in a space. The method for tracking and positioning may be carried out real time during writing. Such a method may be used alone or in the frame of other applications.

The electronic smart device 50 may comprise one or more radio antennas or network of radio antennas 50B.

Figure 3:
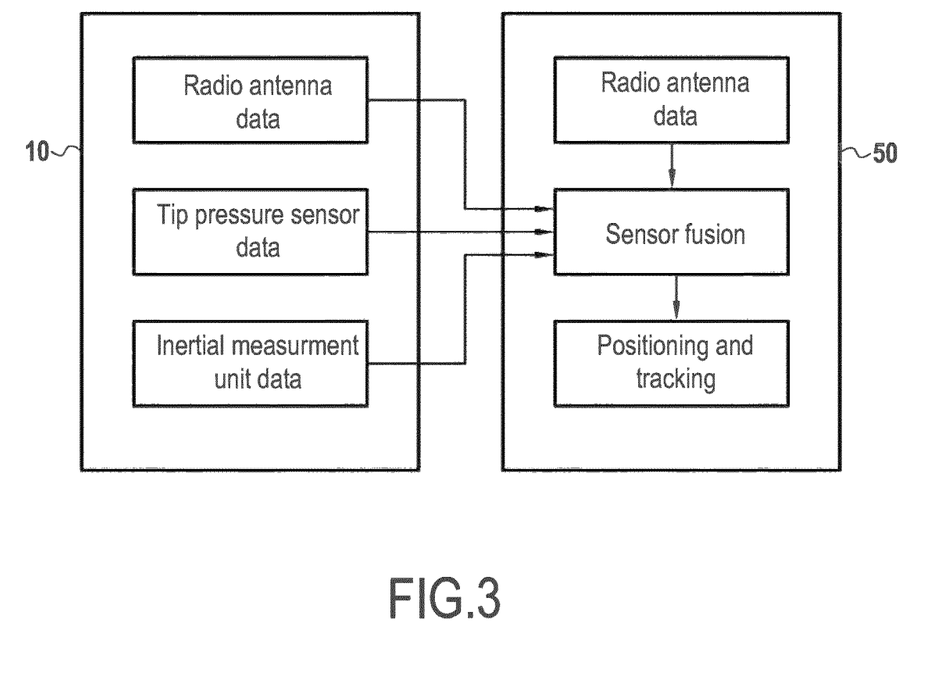
FIG. 3 shows a first embodiment of method steps for tracking and positioning the writing instrument on FIG. 1.

FIG. 3 shows steps of the method for tracking and positioning a writing instrument in a space, according to a first embodiment. In this example, the electronic smart device 50 may be used as reference point.

In a first step, the sensor data may be collected. These data may be raw or pre-processed. The radio antenna data, the tip pressure sensor data and the inertial measurement unit data of the writing instrument 10 are sent by the position detection device 16 to the electronic smart device 50. The radio antenna data of the electronic smart device 50 are collected by the electronic smart device 50. For example, all these data may be collected by a controller 50C of the electronic smart device 50.

The radio antenna data of the writing instrument 10 and the radio antenna data of the electronic smart device 50 are used for radio location of the body 12. This may be carried out based on a distance measure such as a signal strength measure or a time to flight measure. Several radio protocols may be suitable for the radio location. For example, Bluetooth Low Energy (BLE) may be used.

The tip pressure sensor data and the inertial measurement unit data of the writing instrument 10 are used for motion measure of the body 12.

The radio location and the motion measure may be carried out by the electronic smart device 50 as processing unit. For example, the controller 50C of the electronic smart device 50 may have a computer architecture and may carry out the radio location and the motion measure.

Usual radio location may be used for a centimetre-level positioning with regard to a reference point (or a reference device) in an area of several meters around the reference device. However, such location is not accurate enough in order to track and position a writing instrument during its use.

Usual motion measure based on tip pressure sensor data and inertial measurement unit data may be used for a millimetre-level relative positioning (i.e. detecting a motion). However, such measures need periodic initialization from a reference point (or reference device) while integration errors quickly increase so that data become inconsistent.

In a second step, sensor fusion of the data provided in the first step is carried out. For example, the radio location data and the motion measure data may be processed by sensor fusion. The data fusion may be carried out by the electronic smart device 50, for example by the controller 50C. For example, an extended Kalman filter may be used for such a sensor fusion.

The fusion sensor step may merge centimetre-level data from radio location with millimetre-level motion measure to achieve a reliable millimetre-level tracking and positioning of the body 12 in a space, for a long period of time. They may form a low cost and accurate writing instrument positioning system.

Figure 4:
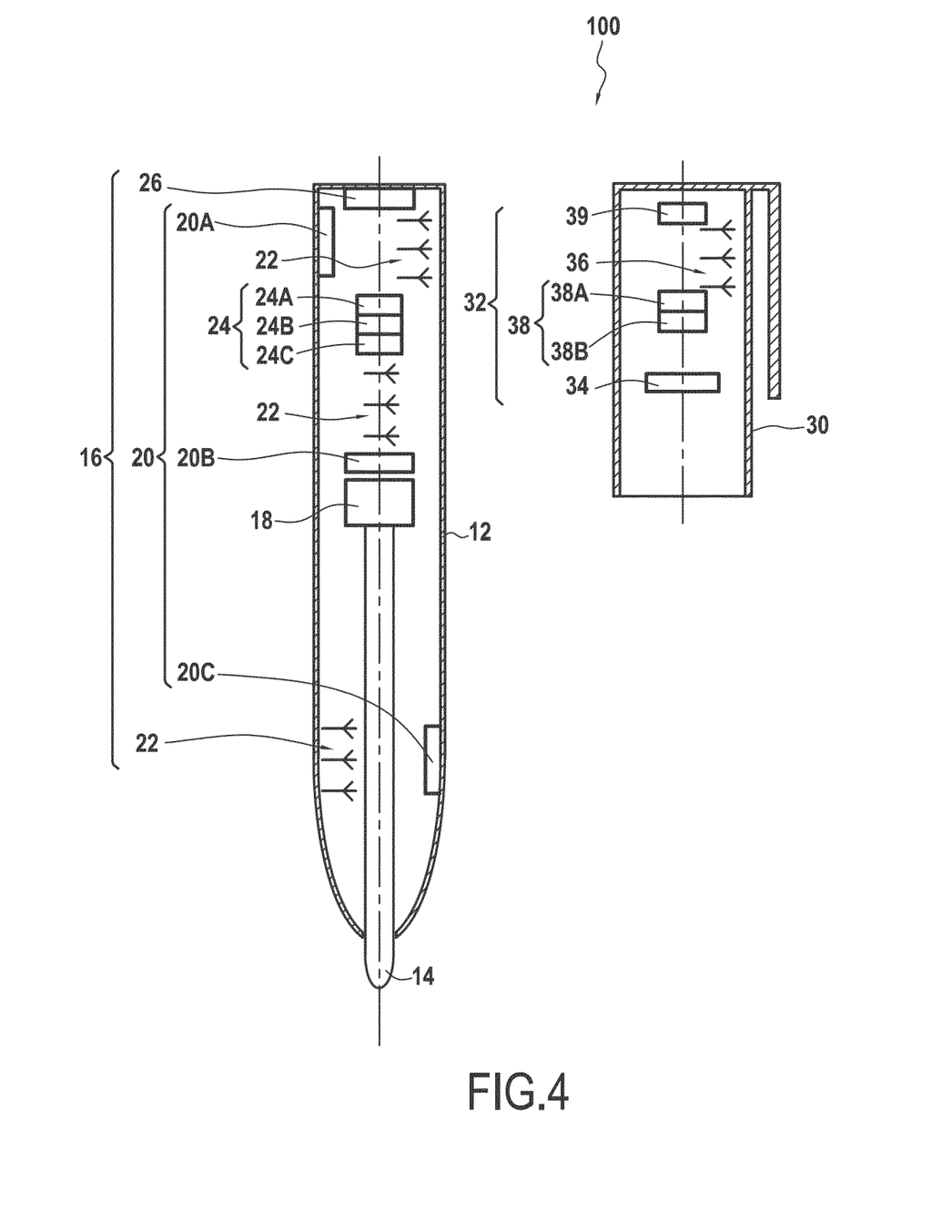
FIG. 4 shows a second embodiment of a writing instrument.

FIG. 4 shows a second embodiment of a writing instrument 100. The writing instrument 100 is the same as the writing instrument 10 of the first embodiment, but it is further provided with a removable cap 30 configured to protect the writing tip 14. The removable cap 30 is provided with an auxiliary position detection device 32, the auxiliary position device 32 comprising an auxiliary inertial measurement unit 34 and a network of auxiliary radio antennas 36. The auxiliary position device 32 is used to augment the functionality of the sensors of the writing instrument 10, i.e. the tip pressure sensor 18 and the inertial measurement unit 20. In examples, the auxiliary position device 32 is used to further augment the position detection done by the writing tip, e.g. a stylus by using the extra data provided by the auxiliary inertial measurement unit and the network of auxiliary radio antennas provided in the cap. The auxiliary inertial measurement unit 20 may comprise an accelerometer and/or a gyroscope and/or a magnetometer. The auxiliary position detection device 32 may comprise a controller 38. The controller 38 may comprise a central processing unit 38A and a transfer module 38B which may be configured to wirelessly transmit and/or receive data to/from one or more emitter/receiver and/or the position detection device 16. The position detection device 32 may comprise a power source 39.

Figure 5:
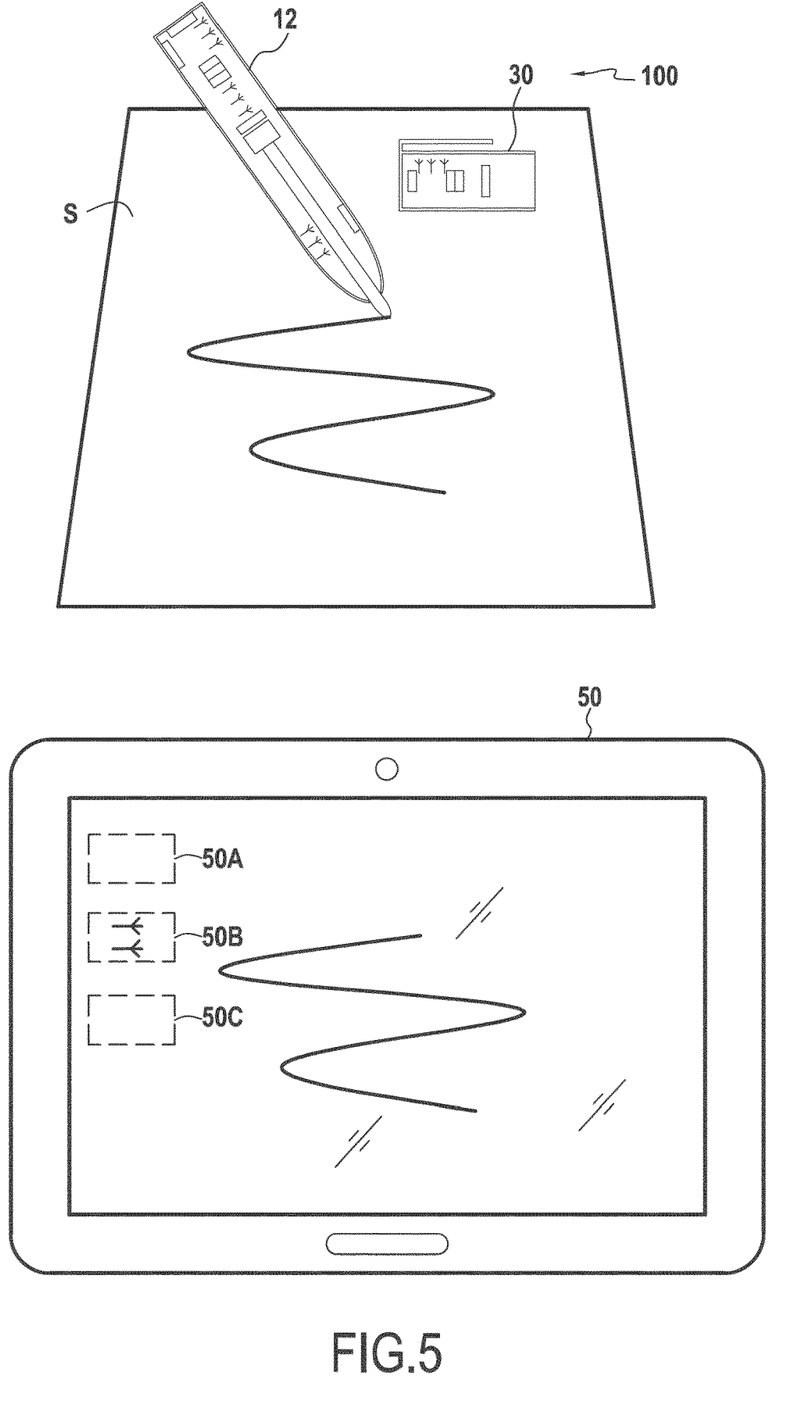
FIG. 5 shows a use of the writing instrument of FIG. 4.

FIG. 5 shows the writing instrument 100, used for writing onto a writing surface S, and the electronic smart device 50. The cap 30 may be placed onto the writing surface S. An application of the electronic smart device 50 may be configured to digitalize the writing of the writing instrument 100. The digitalization may be carried out real time during writing. The digitalization application may comprise a method for tracking and positioning a writing instrument in a space. The method for tracking and positioning may be carried out in real time during writing. Such a method may be used alone or in the frame of other applications.

Figure 6:
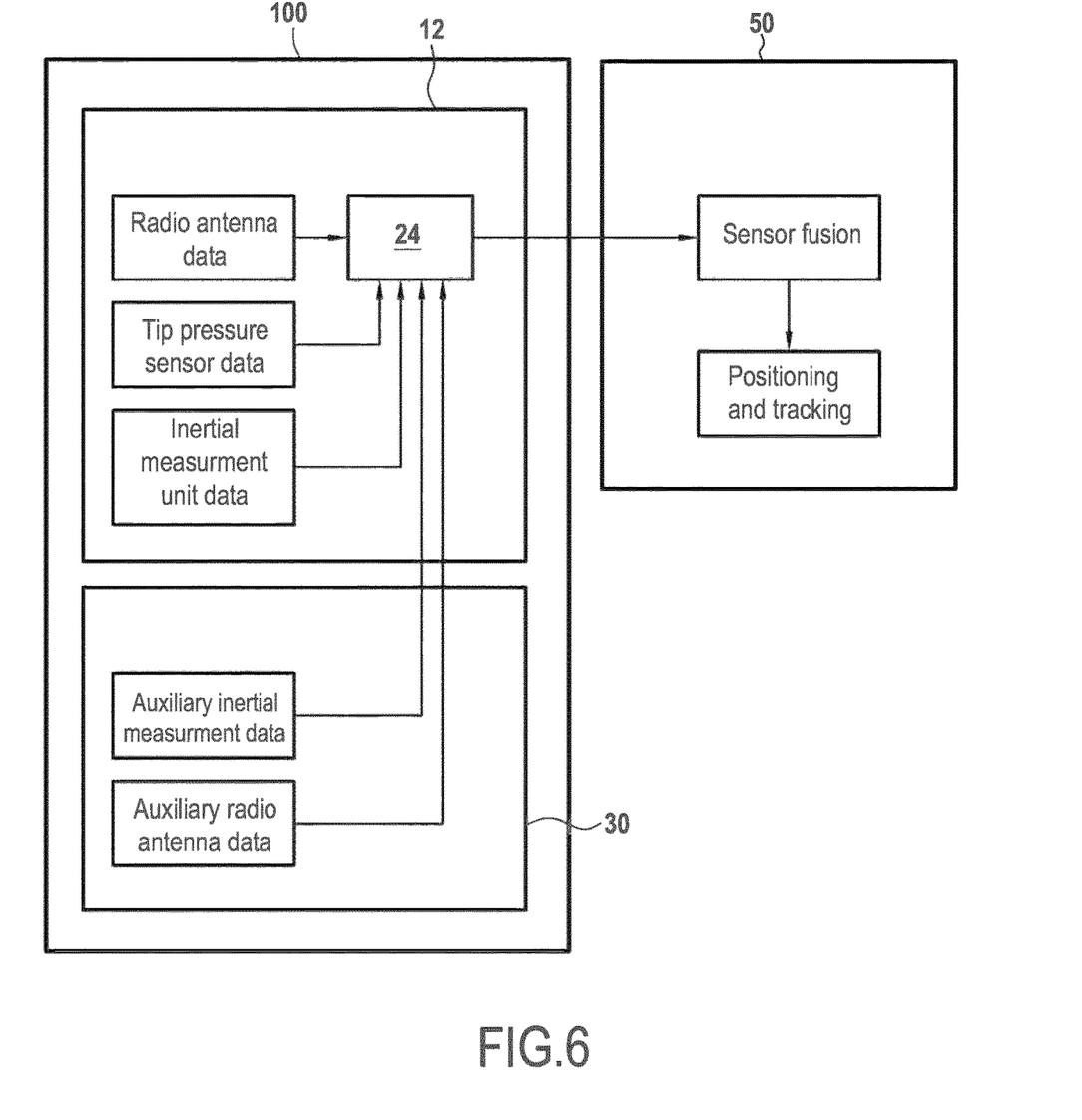
FIG. 6 shows a second embodiment of method steps for tracking and positioning the writing instrument on FIG. 4.

FIG. 6 shows steps of the method for tracking and positioning a writing instrument in a space, according to a second embodiment. In this example, the removable cap 30 may be used as reference position point and the electronic smart device 50 may be used as processing unit. As shown in FIG. 5, the cap 30 may be first removed from the body 12 and placed onto the writing surface S.

In a first step the sensor data are collected. These data may be raw or pre-processed. The inertial measurement unit data of the auxiliary inertial measurement unit 34 and the radio antenna data of the network of auxiliary radio antennas 36 are transmitted by the auxiliary position detection device 30 to the position detection device 16. The radio antenna data of the network of radio antennas 22, the tip pressure sensor data of the tip pressure sensor 18 and the inertial measurement unit data of the inertial measurement unit 20 are collected by the position detection device 16. For example, all these data may be collected by the controller 24 of the position detection device 16. In examples, all these data may be stored in the storage unit 24B during writing and transmitted after writing to the electronic smart device 50 for processing. In examples, all these data may be real time transmitted to the electronic smart device 50, for example for a real time processing.

A radio location and motion measure are carried out by the electronic smart device 50, in the same way as in the method for tracking and positioning a writing instrument in a space described in the first embodiment. The only difference is that the cap 30 is used as a reference point instead of the electronic smart device 50, and thus radio antenna data of the network of auxiliary radio antennas 36 are used instead of the radio antenna data of the electronic smart device 50.

In a second step, sensor fusion of the data provided in the first step is carried out. For example, the radio location data and the motion measure data may be processed by sensor fusion. The data fusion may be carried out by the electronic smart device 50, for example by the controller 50C. For example, an extended Kalman filter may be used for such a sensor fusion.

Although the present disclosure is described with reference to specific examples, it is clear that modifications and changes may be made to these examples without going beyond the general scope of the disclosure. In particular, individual characteristics of the various embodiments shown and/or mentioned may be combined in additional embodiments. Consequently, the description and the drawings should be considered in a sense that is illustrative rather than restrictive.

Additionally, all of the disclosed features of an apparatus may be transposed, alone or in combination, to a method and vice versa.

The invention claimed is:

1. A writing instrument comprising a body and a removable cap, the body being provided with a writing tip and a position detection device, the position detection device being configured to provide data for determining a position of the body in a 2D space or a 3D space, the position detection device comprising a tip pressure sensor, an inertial measurement unit, and a network of radio antennas configured such that the position of the body in the 2D space or 3D space is tracked by sensor fusion, wherein the network of radio antennas provides radio antenna data of the writing instrument, the radio antenna data being used for radio location of the body, the removable cap configured to protect the writing tip, the removable cap being provided with an auxiliary position detection device, the auxiliary position detection device comprising an auxiliary inertial measurement unit and at least one auxiliary radio antenna.

2. A writing instrument according to claim 1, wherein the inertial measurement unit comprises one or more among an accelerometer, a gyroscope, and a magnetometer.

3. A writing instrument according to claim 1, wherein the position detection device is configured to wirelessly transmit data to a receiver.

4. A writing instrument according to claim 1, wherein the auxiliary inertial measurement unit comprises one or more among an auxiliary gyroscope, an auxiliary accelerometer and an auxiliary magnetometer.

5. A writing instrument according to claim 1, wherein the at least one auxiliary radio antenna comprises an auxiliary network of radio antennas.

6. A writing instrument according to claim 3, wherein the auxiliary position detection device is configured to wireless transmit data to the receiver.

7. A method for tracking and positioning a writing instrument in a space, comprising providing a writing instrument according to claim 1, tracking the position of the body of the writing instrument in the 2D space with the position detection device and processing data provided by the position detection device by sensor fusion.

8. A method according to claim 7, wherein tracking the position of the body comprises collecting radio antenna data, tip pressure sensor data and inertial measurement unit data of the writing instrument by the position detection device and sending the collected data by the position detection device to an electronic smart device.

9. A method according to claim 8, further comprising collecting radio antenna data of the electronic smart device and comparing the collected radio antenna data of the writing instrument to the collected radio antenna data of the electronic smart device to determine radio location of the body.

10. A method according to claim 9, wherein determining radio location of the body is based on a distance measurement, in particular a signal strength measurement or a time to flight measurement, the radio location being carried out from the network of radio antennas data, and a motion measurement carried out from the tip pressure sensor data and the inertial measurement unit data, and processing radio location data and motion measure data by sensor fusion.

11. A method according to claim 7, wherein processing by sensor fusion is carried out using an extended Kalman filter.

12. A method according to claim 8, wherein the electronic smart device is used as a reference position point and as processing unit.

13. A computer program including instructions for executing the method according to claim 7 when the program is executed by a computer.

14. A recording medium readable by a computer and having recorded thereon a computer program including instructions for executing the method according to claim 7.

15. A writing instrument according to claim 1, wherein the auxiliary position detection device is configured to wireless transmit data to the position detection device.

16. A method according to claim 8, wherein sensor fusion is a combination of data derived from different sources, in particular from the tip pressure sensor, the inertial measurement unit, and the network of radio antennas.

17. A method according to claim 8, further comprising positioning the body of the writing instrument in space by using the removable cap, particularly by placing the removable cap onto a rear end of the writing instrument.

18. A writing instrument according to claim 1, wherein the writing tip is a felt tip, a ballpoint tip, a mechanical pencil tip, a graphite pencil lead tip, a chalk tip or a stylus tip.

19. A method for tracking and positioning a writing instrument in a space, comprising:
providing a writing instrument including a body, the body being provided with a writing tip and a position detection device, the position detection device being configured to provide data for determining a position of the body in a 2D space or a 3D space, the position detection device comprising a tip pressure sensor, an inertial measurement unit, and a network of radio antennas configured such that the position of the body in the 2D space or 3D space is tracked by sensor fusion, wherein the network of radio antennas provides radio antenna data of the writing instrument, the radio antenna data being used for radio location of the body;
tracking the position of the body of the writing instrument in the 2D space with the position detection device by collecting radio antenna data, tip pressure sensor data and inertial measurement unit data of the writing instrument by the position detection device and sending the collected data by the position detection device to an electronic smart device;

processing data provided by the position detection device by sensor fusion;

collecting radio antenna data of the electronic smart device; and comparing the collected radio antenna data of the writing instrument to the collected radio antenna data of the electronic smart device to determine radio location of the body.

20. A method for tracking and positioning a writing instrument in a space, comprising:

providing a writing instrument including a body, the body being provided with a writing tip and a position detection device, the position detection device being configured to provide data for determining a position of the body in a 2D space or a 3D space, the position detection device comprising a tip pressure sensor, an inertial measurement unit, and a network of radio antennas configured such that the position of the body in the 2D space or 3D space is tracked by sensor fusion, wherein the network of radio antennas provides radio antenna data of the writing instrument, the radio antenna data being used for radio location of the body, the writing instrument further including a removable cap configured to protect the writing tip, the removable cap being provided with an auxiliary position detection device, the auxiliary position detection device comprising an auxiliary inertial measurement unit and at least one auxiliary radio antenna;

tracking the position of the body of the writing instrument in the 2D space with the position detection device;

processing data provided by the position detection device by sensor fusion;

removing the removable cap from the body;

placing the removable cap on a writing surface; and using the removable cap as a reference position point and an electronic smart device as a processing unit.

* * * * *